United States Patent
Nie et al.

(10) Patent No.: US 9,081,114 B2
(45) Date of Patent: Jul. 14, 2015

(54) MULTI-ARRAY LATEROLOG TOOLS AND METHODS WITH SPLIT MONITOR ELECTRODES

(75) Inventors: Xiaochun Nie, Sugarland, TX (US); Shanjun Li, Katy, TX (US); Burkay Donderici, Houston, TX (US); Luis E. San Martin, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 14/356,139

(22) PCT Filed: Jul. 13, 2012

(86) PCT No.: PCT/US2012/046757
§ 371 (c)(1),
(2), (4) Date: May 2, 2014

(87) PCT Pub. No.: WO2013/066436
PCT Pub. Date: May 10, 2013

(65) Prior Publication Data
US 2014/0306710 A1  Oct. 16, 2014

(51) Int. Cl.
*G01V 3/02* (2006.01)
*G01V 3/24* (2006.01)

(52) U.S. Cl.
CPC .......................................... *G01V 3/24* (2013.01)

(58) Field of Classification Search
CPC ............ G01V 3/24; G01V 3/20; G01V 3/265
USPC ....................................................... 324/355
See application file for complete search history.

(56) References Cited

U.S. PATENT DOCUMENTS 3,262,050 A   7/1966  Threadgold et al.
4,412,180 A  10/1983  Desbrandes
(Continued)

FOREIGN PATENT DOCUMENTS

WO   WO-2009/120790   10/2009
WO   WO-2013/066436    5/2013

OTHER PUBLICATIONS

PCT International Search Report and Written Opinion, dated Feb. 1, 2011, Appl No. PCT/US2010/056645, "Multi-Array Laterolog Tools and Methods" filed Nov. 15, 2010, 8 pgs.
(Continued)

*Primary Examiner* — Reena Aurora
(74) *Attorney, Agent, or Firm* — Krueger Iselin LLP; Benjamin Fite (57) ABSTRACT

Multi-array laterolog tool systems and methods acquire a set of array measurements sufficient to provide laterolog tool measurements of differing array sizes. Such systems and method offer multiple depths of investigation while offering greater measurement stability in borehole environments having high resistivity contrasts. In at least some system embodiments, a wireline or LWD tool body has a center electrode positioned between multiple pairs of guard electrodes and a pair of return electrodes. At least some of the guard electrodes are positioned between component electrodes of associated split monitor electrodes that enable more accurate measurement of the guard electrode potential. The tool's electronics provide a current from the center electrode to the pair of return electrodes and currents from each pair of guard electrodes to the pair of return electrodes. Each of the currents may be distinguishable by frequency or distinguishable by some other means.

20 Claims, 6 Drawing Sheets

(56) References Cited

U.S. PATENT DOCUMENTS

| | | | |
|---|---|---|---|
| 4,484,139 | A | 11/1984 | Bravenec |
| 4,524,325 | A | 6/1985 | Moore et al. |
| 4,570,123 | A | 2/1986 | Grosso |
| 4,675,610 | A | 6/1987 | Chapman et al. |
| 4,675,611 | A | 6/1987 | Chapman et al. |
| 4,677,385 | A | 6/1987 | Chapman et al. |
| 4,677,386 | A | 6/1987 | Chapman et al. |
| 4,703,279 | A | 10/1987 | Chapman et al. |
| 4,714,889 | A | 12/1987 | Chapman et al. |
| 5,343,153 | A | 8/1994 | Davies et al. |
| 5,396,175 | A | 3/1995 | Seeman |
| 5,399,971 | A | 3/1995 | Seeman et al. |
| 5,852,363 | A | 12/1998 | Smits |
| 5,955,884 | A | 9/1999 | Payton et al. |
| 6,023,168 | A | 2/2000 | Minerbo |
| 6,060,885 | A | 5/2000 | Tabarovsky et al. |
| 6,060,886 | A | 5/2000 | Tabarovsky et al. |
| 6,304,086 | B1 | 10/2001 | Minerbo et al. |
| 7,027,967 | B1 | 4/2006 | Barber |
| 2007/0268782 | A1 | 11/2007 | Pabon et al. |
| 2008/0303526 | A1 | 12/2008 | Itskovich et al. |
| 2009/0309591 | A1 | 12/2009 | Goodman et al. |
| 2013/0234718 | A1 | 9/2013 | Li et al. |
| 2013/0257436 | A1 | 10/2013 | Bittar et al. |

OTHER PUBLICATIONS

Ari. Azimuthal Resistivity Imager., 1993. *Schlumberger Wireline and Testing*. Retrieved from the Internet: <http://www.slb.com/~/media/Files/resources/books/industry_articles/ari_client_book.ashx>., pp. 1-15.

PCT International Search Report and Written Opinion, dated Feb. 27, 2012, Appl No. PCT/US2011/058867, "Multi-Array Laterolog Tools and Methods with Differential Voltage Measurements", filed Nov. 2, 2011, 9 pgs.

PCT International Search Report and Written Opinion, dated Sep. 28, 2012, Appl No. PCT/US2012/046757, "Multi-Array Laterolog Tools and Methods With Split Monitor Electrodes", filed Jul. 13, 2012, 8 pgs.

PCT International Preliminary Report on Patentability, dated Nov. 26, 2012, Appl No. PCT/US2010/056645, "Multi-Array Laterolog Tools and Methods" filed Nov. 15, 2010, 3 pgs.

PCT International Preliminary Report on Patentability, dated May 30, 2013, Appl No. PCT/US2011/058867, "Multi-Array Laterolog Tools and Methods with Differential Voltage Measurements", filed Nov. 2, 2011, 5 pgs.

PCT International Preliminary Report on Patentability, dated Nov. 26, 2013, Appl No. PCT/US12/46757, "Multi-array Laterolog Tools and Methods with Slit Monitor Electrodes," filed Jul. 13, 2012, 5 pgs.

AU Patent Examination Report No. 1, dated Apr. 17, 2014, Appl. No. 2011329362, "Multi-Array Laterolog Tools and Methods with Differential Voltage Measurements," Filed Nov. 15, 2010, 3 pgs.

MULTI-ARRAY LATEROLOG TOOLS AND METHODS WITH SPLIT MONITOR ELECTRODES

RELATED APPLICATIONS

The present application is a continuation in part of application PCT/US2011/058867, titled "Multi-array laterolog tools and methods with differential voltage measurements" and filed Nov. 2, 2011 by inventors Shanjun Li and Luis San Martin, which is a continuation in part of application PCT/US2010/056645, titled "Multi-array laterolog tools and methods" and filed Nov. 15, 2010, by inventors Michael Bittar, Shanjun Li, and Jing Li.

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

In wireline logging, a sonde is lowered into the borehole after some or all of the well has been drilled. The sonde hangs at the end of a long wireline cable that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

Among the available wireline and LWD tools are a variety of resistivity logging tools including, in particular, "array laterolog" tools. Such tools typically include a central electrode around a tool body, with guard electrodes symmetrically spaced above and below the central electrode. The tool drives auxiliary currents between the guard electrodes and the center electrode to "focus" the current from the center electrode, i.e., to reduce dispersion of the current from the center electrode until after the current has penetrated some distance into the formation. Generally speaking, a greater depth of investigation can be achieved using more widely-spaced guard electrodes, but the vertical resolution of the measurements may suffer. Accordingly, existing tools employ multiple sets of guard electrodes at different spacings from the central electrode to enable multiple depths of investigation without unduly sacrificing vertical resolution. Laterolog tools with one, two, three, and four sets of guard electrodes have been created. Though measurements of the simpler tools are conceptually subsets of the measurements provided by the more complex tools, in practice the presence of the extra guard electrodes affects the measurements of the complex tools, thereby making it difficult to compare measurements from different tools.

Accordingly, Halliburton has disclosed certain multi-array laterolog tool systems and methods in the above-mentioned patent applications PCT/US2011/058867 and PCT/US2010/056645, which are parents of the present application. The disclosed multi-array laterolog tool systems and methods acquire a set of array measurements sufficient to provide laterolog tool measurements of differing array sizes. Such systems and method offer multiple depths of investigation while offering greater measurement stability in borehole environments having high resistivity contrasts. In at least some system embodiments, a wireline or LWD tool body has a center electrode positioned between multiple pairs of guard electrodes and a pair of return electrodes. The tool's electronics provide a current from the center electrode to the pair of return electrodes and currents from each pair of guard electrodes to the pair of return electrodes. Each of the currents may be distinguishable by frequency or distinguishable by some other means. This arrangement of currents provides a complete set of measurements that enables one tool to simultaneously emulate a whole range of laterolog tools.

DESCRIPTION OF THE DRAWINGS

The various disclosed embodiments are better understood when the following detailed description is considered in conjunction with the accompanying drawings, in which.

While the invention is susceptible to various modifications and alternative forms, specific embodiments are shown by way of example in the drawings and will herein be described in detail. It should be understood, however, that the drawings and detailed description are not intended to limit the disclosure, but on the contrary, the intention is to cover all modifications, equivalents and alternatives falling within the scope of the appended claims.

DETAILED DESCRIPTION

Improvements to the previously-disclosed multi-array laterolog tool systems and methods have now been discovered and shown to enhance tool performance. When the tools are provided with split monitor electrodes, it becomes possible to obtain significantly increased signal levels and improved tool performance even as the improved tool design enables the acquisition of significantly fewer measurement signals. In at least some system embodiments, a wireline or LWD tool body has a center electrode positioned between multiple pairs of guard electrodes and a pair of return electrodes. At least some of the guard electrodes are bounded by split monitor electrodes having two electrically-coupled component electrodes. The tool's electronics provide a current from the center electrode to the pair of return electrodes and currents from each pair of guard electrodes to the pair of return electrodes. The electronics further operate to acquire voltage measurements using each of the split monitor electrodes.

Each of the currents may be distinguishable by frequency or distinguishable by some other means. This arrangement of currents provides a complete set of measurements that enables one tool to simultaneously emulate a whole range of laterolog tools. The contemplated numbers of guard electrode pairs ranges from three to five, though of course more can be employed if space permits.

Figure 3:
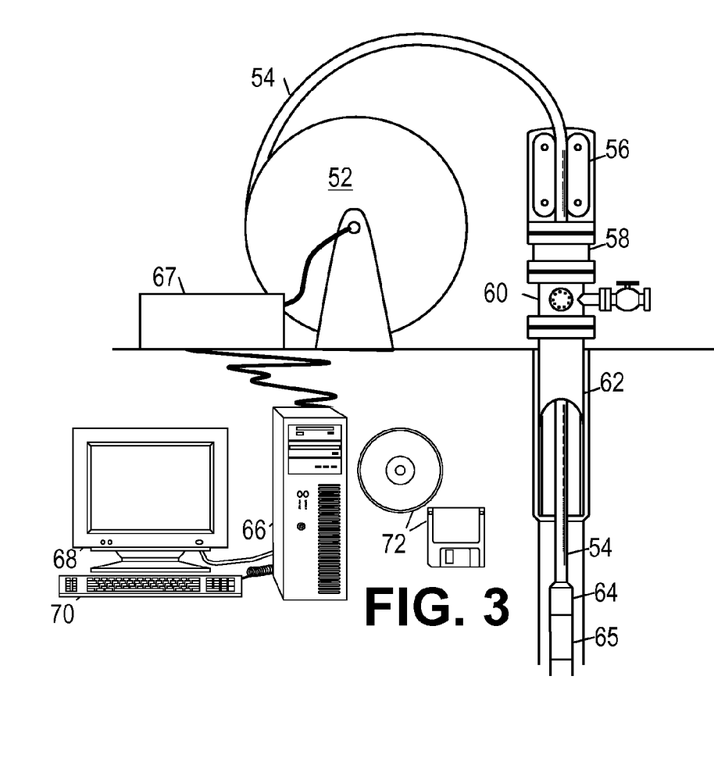
FIG. 3 shows an illustrative environment for tubing-conveyed logging.

The disclosed systems and methods are best understood in the context of the larger environments in which they operate. Suitable environments are illustrated in FIGS. 1-3.

Figures 1, 2:
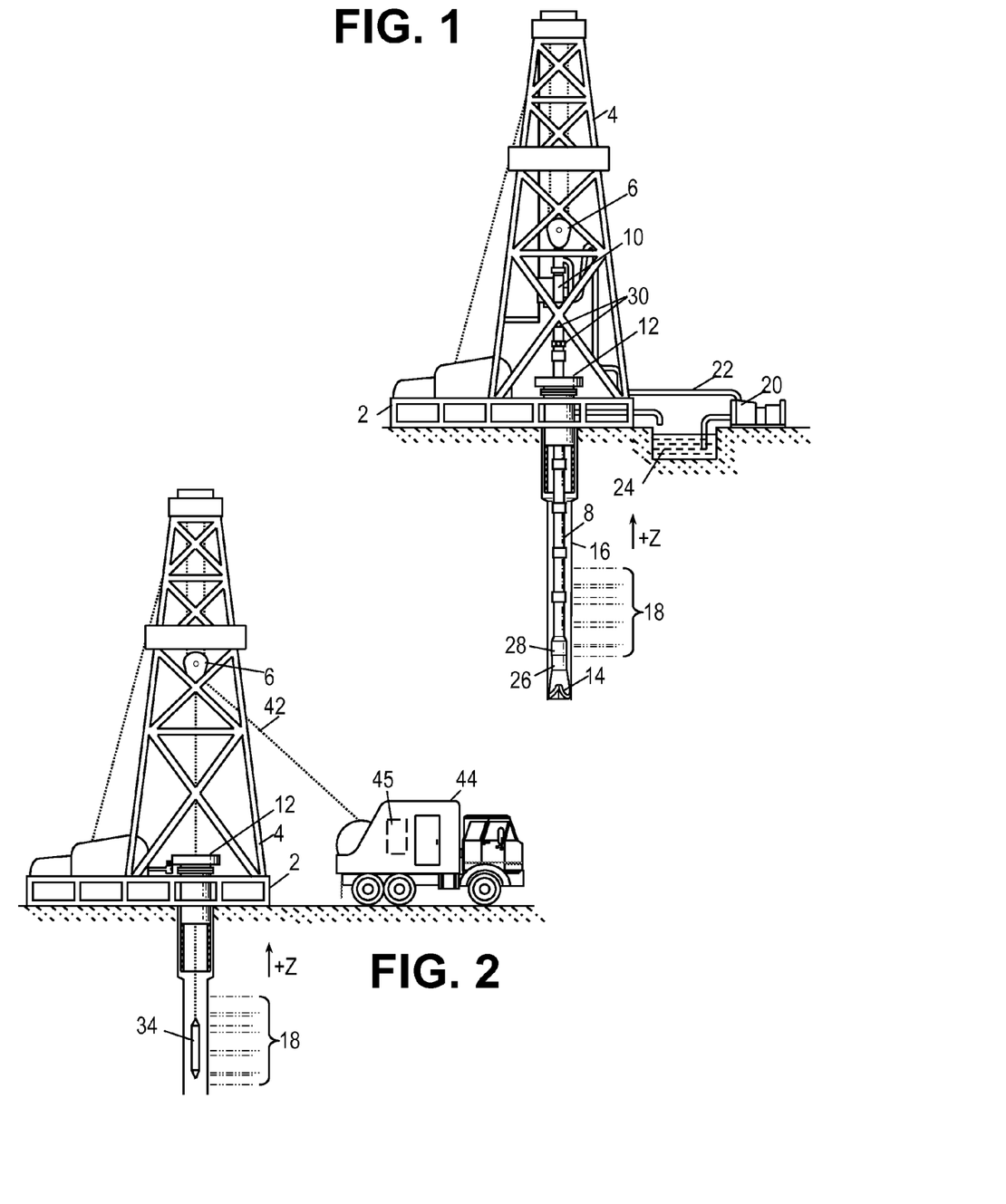
FIG. 1 shows an illustrative environment for logging while drilling ("LWD")
FIG. 2 shows an illustrative environment for wireline logging.

FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16. Various materials can be used for drilling fluid, including a salt-water based conductive mud.

A LWD tool suite 26 is integrated into the bottom-hole assembly near the bit 14. As the bit extends the borehole through the formations, logging tool 26 collects measurements relating to various formation properties as well as the tool orientation and various other drilling conditions. The LWD tools 26 may take the form of a drill collar, i.e., a thick-walled tubular that provides weight and rigidity to aid the drilling process. (For the present discussion, the set of logging tools is expected to include a multi-array laterolog resistivity tool to measure formation resistivity.) A telemetry sub 28 may be included to transfer images and measurement data to a surface receiver 30 and to receive commands from the surface. In some embodiments, the telemetry sub 28 does not communicate with the surface, but rather stores logging data for later retrieval at the surface when the logging assembly is recovered.

At various times during the drilling process, the drill string 8 may be removed from the borehole as shown in FIG. 2. Once the drill string has been removed, logging operations can be conducted using a wireline logging sonde 34, i.e., a probe suspended by a cable 42 having conductors for transporting power to the sonde and telemetry from the sonde to the surface. A wireline logging sonde 34 may have pads and/or centralizing springs to maintain the tool near the axis of the borehole as the tool is pulled uphole. Logging sonde 34 can include a variety of sensors including a multi-array laterolog tool for measuring formation resistivity. A logging facility 44 collects measurements from the logging sonde 34, and includes a computer system 45 for processing and storing the measurements gathered by the sensors.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as a multi-array laterolog tool. Surface computer system 66 is configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments, the logging tool assemblies may include a navigational sensor package having directional sensors for determining the inclination angle, the horizontal angle, and the rotational angle (a.k.a. "tool face angle") of the bottomhole assembly (BHA). As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA can be determined. Additionally, a three axis magnetometer measures the earth's magnetic field vector in a similar manner. From the combined magnetometer and accelerometer data, the horizontal angle of the BHA may be determined.

Figure 4:
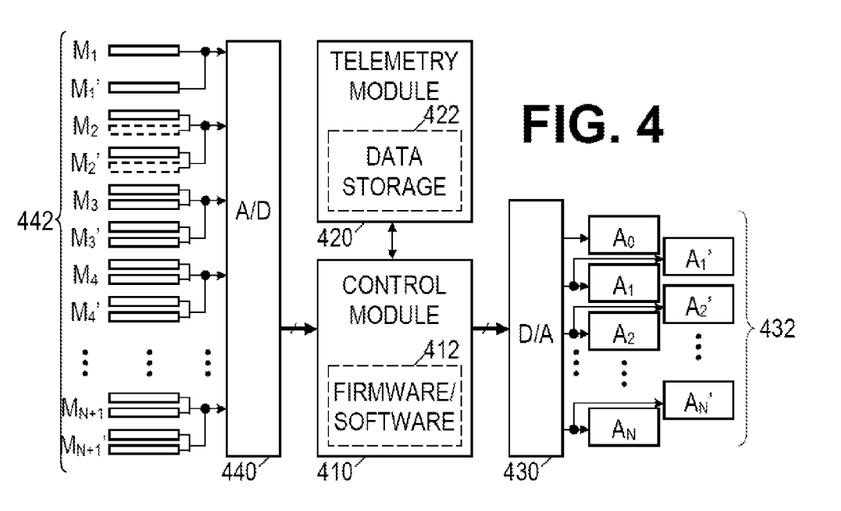
FIG. 4 is a block diagram of an illustrative multi-array laterolog tool.

A discussion of the electronics for the multi-array laterolog tool with split monitor electrodes is in order before describing the physical construction of the enhanced tool. FIG. 4 shows a functional block diagram of the tool electronics. The control module 410 governs the operation of the tool in accordance with software and/or firmware 412 stored in internal memory. The control module 410 couples to telemetry module 420 to receive commands and to provide measurement data. Control module 410 further connects to digital-to-analog converter 430 to drive current electrodes 432, and connects to analog-to-digital converter 440 to make voltage measurements via monitor electrodes 442. Control module 410 can be, for example, a general purpose processor, a digital signal processor, a programmable gate array, or an application specific integrated circuit. Telemetry module 420 receives and stores measurement data in a nonvolatile memory 422, and further operates as a communications interface between the control module 410 and the telemetry communications mechanism.

FIG. 4 shows 2N+1 current electrodes (electrodes $A_0$, $A_1$, $A_2$, ... $A_N$, $A_1'$, $A_2'$, ... $A_N'$) being driven in a pairwise fashion (current electrodes $A_1$ and $A_1'$ are electrically connected, current electrodes $A_2$ and $A_2'$ are electrically connected, and so on, including the return electrodes $A_N$ and $A_N'$) via digital-to-analog converter 430. In some alternative tool embodiments, the guard electrodes can each be driven independently, though this would require the A/D convertor to support nearly twice the number of output signals.

Similarly, the monitor electrodes 442 are shown as being electrically connected in pairs, i.e., with electrode $M_1$ connected to $M_1'$, electrode $M_2$ connected to $M_2'$, etc. Moreover, as explained further below, monitor electrodes $M_3$-$M_{N+1}$ and $M_3'$-$M_{N+}'$ are split so as to enclose a corresponding current electrode. (In some embodiments, monitor electrodes $M_2$ and $M_2'$ are also split as described further below.) It is also contemplated that each monitor electrode can be individually sensed and that the control module can collect the pair-wise measurements by appropriately combining the individual monitor electrode voltages, though this approach doubles the number of measured signals. If measuring this number of signals is feasible, it may be preferred that the additional signal measurements be differential signals between adjacent monitor electrodes as described in parent application PCT/US2011/058867. The acquisition of differential measurements may be desirable because such measurements are, in many cases, very small relative to the non-differential voltages. Moreover, the derived resistivity can be very sensitive to error in the differential values, so these measurements might preferably be acquired with a dedicated, high accuracy analog-to-digital converter rather than digitizing the monitor electrode voltages separately before determining the differences.

Figure 5A:
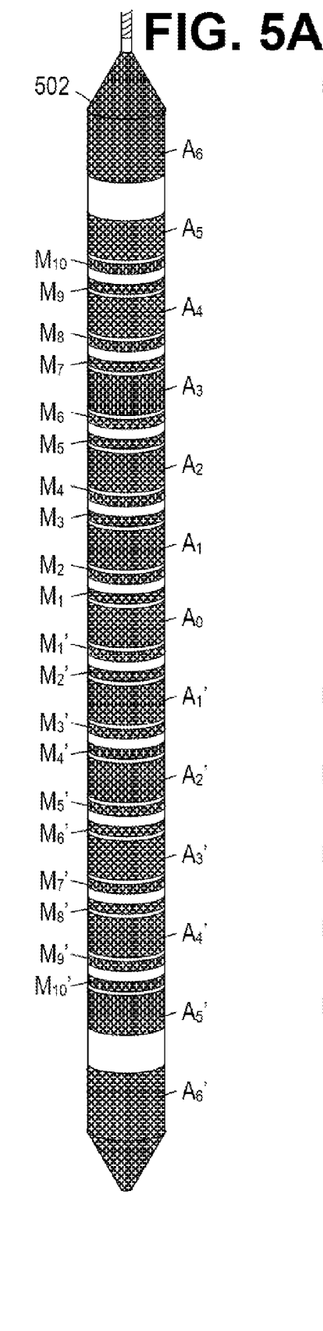
FIGS. 5A-5C show illustrative multi-array laterolog tool embodiments.

FIG. 5A shows an illustrative multi-array laterolog tool 502 from the parent application having (for the sake of illustration) equally-spaced current electrodes and return electrodes (electrodes $A_0, A_1, A_2, \ldots A_6, A_1', A_2', \ldots A_6'$), with interspersed monitor electrodes $M_1$-$M_{10}$ and $M_1'$-$M_{10}'$ on a wireline tool body. (It is desirable to separate the monitor electrodes from the current electrodes because the current electrodes often develop an impedance layer that distorts voltage measurements when current is flowing.) The term "pair" will be consistently used to refer to monitor electrodes symmetrically located relative to the center electrode, e.g. $M_1$ and $M_1'$, or $M_6$ and $M_6'$.

Though the figure shows equally-spaced, uniformly-sized current electrodes, the electrodes are typically not equally sized and spaced. Better performance is achieved by having the more distant electrodes increase in size. Thus, in one contemplated embodiment the center electrode $A_0$ has an axial length of 6 inches. The lengths of electrodes $A_i$ and $A_i'$ for i ranging from 1 to 6 is (in inches) 6, 8, 10, 14, 20, and 75. The spacing between the current electrodes also increases, beginning at 6 inches between electrodes $A_0$ and $A_1$, 6 inches between electrodes $A_1$ and $A_2$, 10 inches between electrodes $A_2$ and $A_3$, 14 inches between $A_3$ and $A_4$, 19 inches between $A_4$ and $A_5$, and 34 inches between $A_5$ and $A_6$. (These spacings are measured between the nearest edges and not center to center, and they are symmetric with respect to the center electrode.) In this contemplated embodiment, each of the monitor electrodes has an axial length of 1 inch. With one exception, the monitor electrodes are spaced 1 inch away from the nearest current electrode. (Electrodes $M_2$ and $M_2'$ may be spaced 2 inches from current electrodes $A_1$ and $A_1'$, respectively.)

Figure 5B:
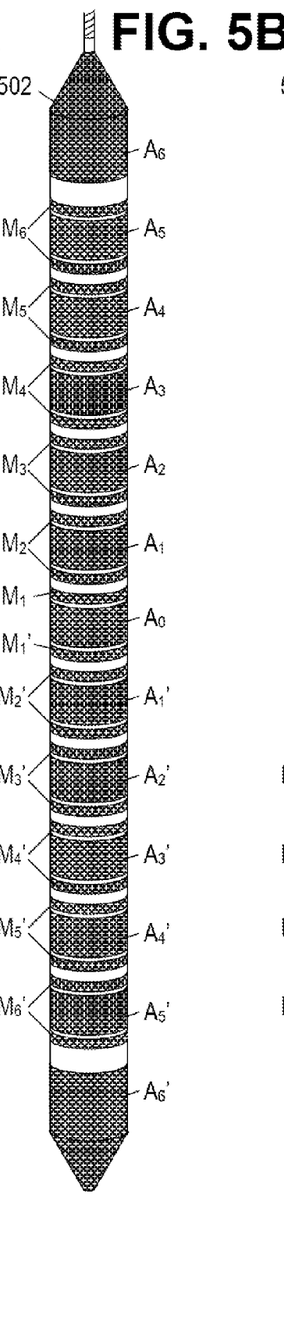

FIG. 5B shows an improved multi-array laterolog tool embodiment having the same external configuration of electrodes with the addition of monitor electrodes between the outermost pair of current electrodes $A_5, A_5'$ and the return electrodes $A_6, A_6'$. Rather than having the monitor electrode voltages independently measured as described in the parent application, the improved tool employs the internal wiring configuration provided in FIG. 4. Because the monitor electrodes on each side of a current electrode (except perhaps the innermost electrode pair $A_1$ and $A_1'$ as discussed further below) are wired together, they effectively form a single "split" monitor electrode. The monitor electrode labeling has been correspondingly adjusted to reduce the number of monitor electrodes from 10 pairs to 6 pairs. This split electrode configuration yields a more accurate measure of the potential on the current electrodes, and extends the equipotential regions of the various array configurations, providing an improved depth of investigation. Moreover, the signal levels are increased in high contrast formations (formations having much higher resistivity than the borehole fluid) due to the current flow patterns from the current electrodes.

Figure 5C:
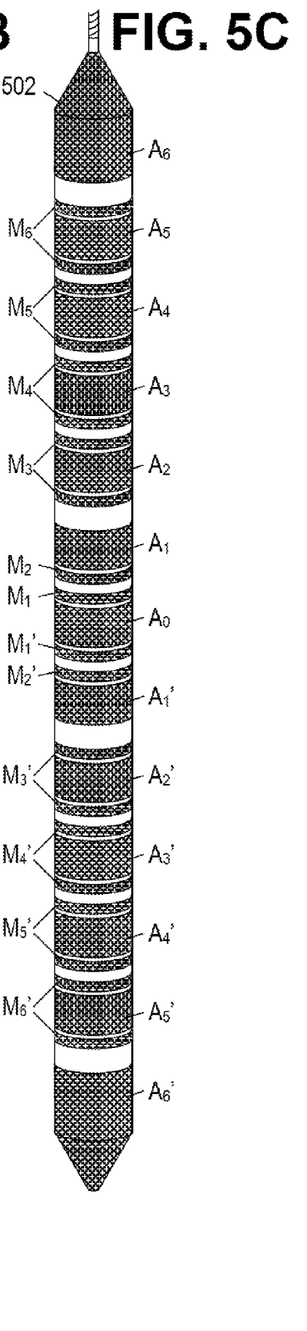

FIG. 5C shows an alternative embodiment in which the $M_2$ electrode (and $M_2'$ electrode) is not split, but rather retains its configuration from FIG. 5A. Though otherwise equivalent to the embodiment of FIG. 5B, this alternative embodiment avoids any loss of resolution that might otherwise result from extending the equipotential region of the smallest laterolog array configuration.

Figure 6:
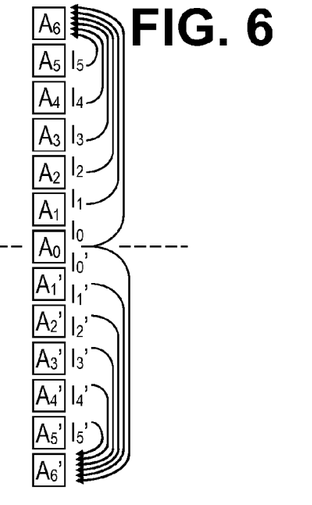
FIG. 6 illustrates a current flow pattern for a laterolog tool with six sets of guard electrodes.

The tool electronics employ the current electrodes to provide the currents $I_0$-$I_5$ and $I_0'$-$I_5'$ as illustrated in FIG. 6. Currents $I_0$-$I_5$ are sourced from electrodes $A_0$-$A_5$ respectively, with electrode $A_6$ serving as a common return electrode for each of these currents. Similarly, currents $I_0'$-$I_5'$ are sourced from electrodes $A_0$ and $A_1'$-$A_5'$ respectively, with electrode $A_6'$ serving as a common return electrode for these currents. If the current and monitor electrodes are pair-wise connected as discussed before, the tool cannot distinguish currents $I_0$-$I_5'$ from $I_0'$-$I_5'$, but instead operates on the combined currents $(I_0+I_0', I_1+I_1', I_2+I_2', \ldots)$. Otherwise, the tool can analyze currents $I_0$-$I_5$ separately from $I_0'$-$I_5'$, or in the alternative, combine the currents and voltages digitally before analyzing. Due to the symmetry of the array, only the top half is illustrated in the ensuing figures. Though not shown, the bottom half is presumed to be present.

To enable the monitor electrodes to distinguish the effects of the various currents, the currents are given distinguishable features. In the contemplated tool embodiment, the electrodes are pair-wise connected and currents $I_0$-$I_5$ have distinguishable signal frequencies $f_0$-$f_5$. The contemplated set of frequencies includes 80 Hz, 112 Hz, 144 Hz, 176 Hz, 208 Hz, and 272 Hz. (It is expected that the borehole fluid will be fairly conductive, thereby allowing low frequency currents to pass into and through the formation.) This frequency set offers sufficient frequency spacing to enable fast logging, while not spreading the frequencies so far apart as to incur excessive frequency dependence in the resistivity measurements. Moreover this frequency set avoids the use of harmonic frequencies which could be unduly sensitive to non-linear effects in the system. Nevertheless, other sets of frequencies would also be suitable for distinguishing the currents. Alternatively, the currents could be distinguished through the use of time division multiplexing, code division multiplexing, or other methods that enable the currents to be independently monitored.

While each of the currents is provided with a characteristic that makes its effects distinguishable from those of the other currents, in at least some tool embodiments some of the currents are given common features. For example, some tool embodiments provide current $I_0$ with frequencies $f_0$ and $f_1$. The sharing of frequency $f_1$ by both current $I_0$ and $I_1$ enables straightforward hardware focusing as described in greater detail below.

As the tool drives the current electrodes, the currents pass through the borehole fluid and the formation to reach the return electrodes, creating a field potential indicative of the resistivity of the materials along the various current flow paths. The control module records a voltage signal from each pair of monitor electrodes to measure the field potential at the monitor electrode locations, which at least in the case of the split monitor electrodes should accurately correspond to the current electrode potentials. A frequency analysis of the voltage signals (e.g., by Fourier transform, filtering, or leastsquares curve fitting) separates out those voltage signal components attributable to each of the currents.

Figure 7A:
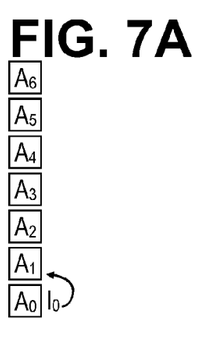
FIGS. 7A-7F illustrates the current flow patterns that can be derived from measurements of the FIG. 6 current flow pattern.
Figure 7B:
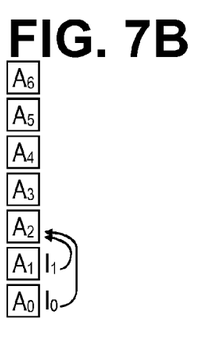
Figure 7C:
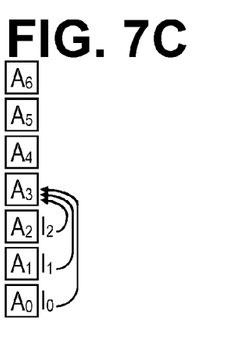
Figure 7D:
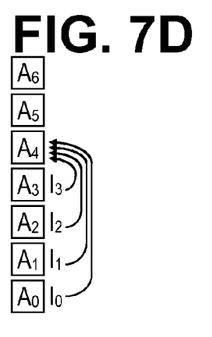
Figure 7E:
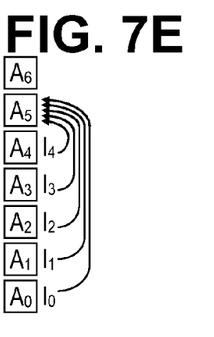
Figure 7F:
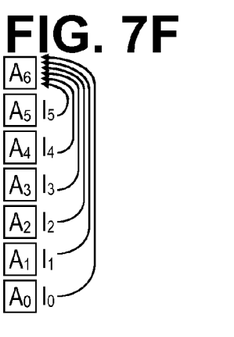

With the measurements for the current flow pattern of FIG. 6, it becomes possible to derive the measurements associated with each of the current flow patterns provided in FIGS. 7A-7F. FIG. 7F represents the full array measurement (which corresponds to the actual current flow pattern of FIG. 6), while FIGS. 7A-7E represent truncated array measurements of various degrees. In FIG. 7A (sometimes referred to below as Mode 0), current electrode $A_1$ is the shared return electrode, whereas in FIG. 7B (Mode 1), current electrode $A_2$ is the shared return electrode, and so on. By determining measurements for each of the array sizes, the tool can provide resistivity measurements not only as a function of tool position, but also as a function of radial distance from the borehole.

Figure 8A:
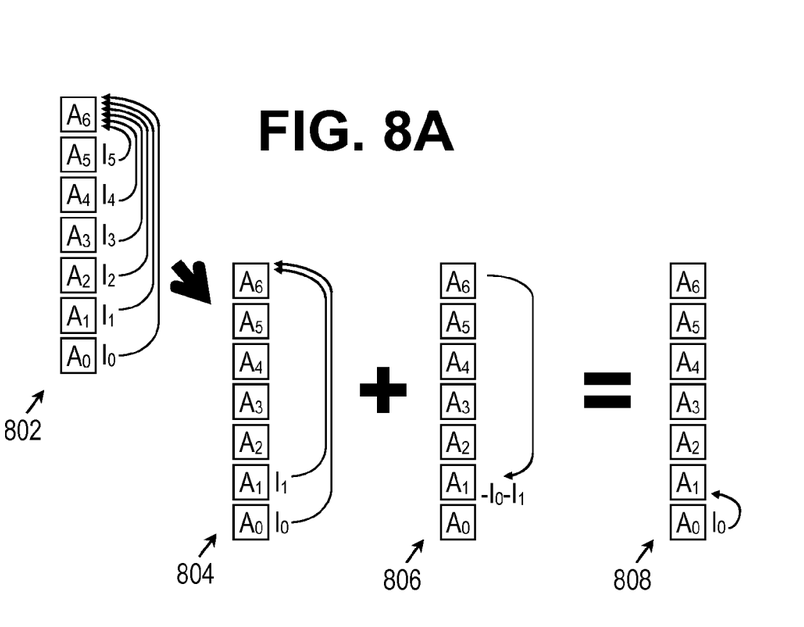
FIGS. 8A-8C illustrate a derivation of flow patterns in FIGS. 7A-7C.

FIG. 8A demonstrates one technique for deriving the tool measurements of FIG. 7A (Mode 0) from the complete set of measurements 802. The voltage measurements corresponding to currents $I_0$ and $I_1$ are extracted (label 804), e.g., by identifying those components of the monitor electrode voltage signals having the corresponding frequency components. The difference between the measurements for the desired truncated current flow pattern 808 and the extracted measurements is that set of voltage measurements that would be obtained in response to the current flow pattern 806, which can be readily derived from the measurements corresponding to current $I_1$.

Representing the extracted measurements for monitor electrode Mi in vector form:

$$v_i = [v_{i,0}\ v_{i,1}] \quad (1)$$

where the different vector components correspond to different frequencies f0, f1 . (Throughout the following description, $v_{ij}$ represents the jth frequency component of the voltage signal received by the ith monitor electrode.) If the currents I0 and I1 differ only in frequency and not magnitude, then the truncated flow pattern measurements 808 are:

$$v'_i = [v_{i,0} - v_{i,1}\ v_{i,1} - v_{i,1}] \quad (2)$$

The last vector component is of course zero, as I1 is not part of the truncated flow pattern. (Where the current magnitudes are not equal the measurements should be scaled accordingly before applying the correction. Thus if the amplitude of I1 is C1 and the amplitude of I0 is C0, equation (2) becomes:

$$v'_i = \left[v_{i,0} - \frac{c_0}{c_1}v_{i,1}\quad v_{i,1} - \frac{c_1}{c_1}v_{i,1}\right] \quad (2b)$$

In the either case, the apparent resistivity measured with Mode 0 is:

$$R_0 = k_0 V_{M1}/I_0, \text{ with} \quad (3a)$$

$$V_{M1} = v'_{0,0}. \quad 3b$$

Figure 8B:
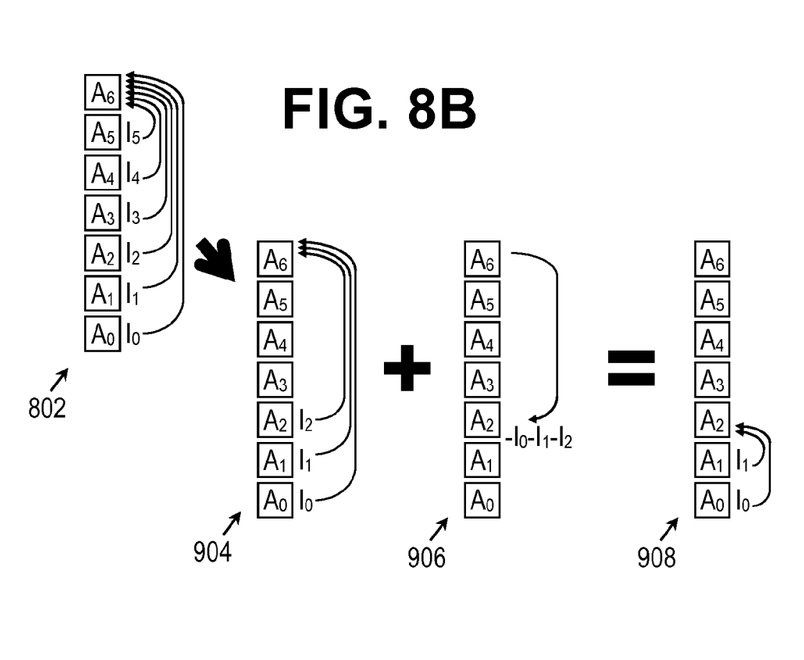

For Mode 1, a similar approach is taken with the measurements corresponding to currents $I_0$, $I_1$, and $I_2$ being extracted (label 904), e.g., by identifying those components of the monitor electrode voltage signals having the corresponding frequency components. The difference between the measurements for the desired truncated current flow pattern 908 and the extracted measurements 904 is that set of voltage measurements that would be obtained in response to the current flow pattern 906, which can be readily derived from the measurements corresponding to current $I_2$.

The extracted measurements vector becomes:

$$v_i = [v_{i,0}\ v_{i,1}\ v_{i,2}] \quad (4)$$

where the different vector components correspond to different frequencies f0, f1 , f2. If the currents I1, I1 and I2 differ only in frequency and not magnitude, then the truncated flow pattern measurements 908 are:

$$v'_i = [v_{i,0} - v_{i,2}\ v_{i,1} - v_{i,2}\ v_{i,2} - v_{i,2}] \quad (5)$$

The last vector component is of course zero, as I2 is not part of the truncated flow pattern. (As previously mentioned, if the current magnitudes are not equal the measurements should be scaled accordingly before applying the correction.)

Those familiar with laterolog tools recognize that the analysis is not yet complete, as the tool has not yet provided for focusing of the current. As with existing laterolog tools, focusing is accomplished by balancing the current from the center electrode with currents from the guard electrodes. In the current flow pattern of FIG. 7B, the proper balance has been achieved when monitor electrodes M1 and M2 have equal potentials. If hardware focusing is employed, this balancing is done by the tool itself and the apparent resistivity is calculated as before. If software focusing is employed, the calculation depends on the solution to the simultaneous equations:

$$\begin{bmatrix} v'_{1,0} - v'_{2,0} & v'_{1,2} - v'_{2,2} \\ I_{0,0} & I_{2,2} \end{bmatrix} \begin{bmatrix} c_{1,1} \\ c_{1,2} \end{bmatrix} = \begin{bmatrix} v'_{2,1} - v'_{1,1} \\ -(I_{0,1} + I_{1,1}) \end{bmatrix} \quad (6)$$

The term $I_{i,j}$ is the magnitude of current injected by electrode $A_j$ with frequency $f_j$. For example, $I_{2,2}$ denotes the magnitude of the current with frequency $f_2$ from electrode $A_2$. The second row of Eqn. (6) is the current continuity condition, which implies that all the currents emitted by the working electrodes return to the virtual current returns, thus the present tool doesn't need a bridle and a current return on the surface, resulting in reduced rig time and improved logging efficiency. In the software focusing, the currents f0 and f2 are actually used to correct the current on A0 and the potentials on M1 and M2 due to the hardware focusing current f1. Once the current on A0 and the potential on M1 are obtained, the apparent resistivity of Mode 1 can be calculated by:

$$R_1 = k_1 \frac{V_{M1}(f0, f1, f2)}{I_{A0}(f0, f1, f2)}, \text{ with} \quad (7a)$$

$$V_{M1} = c_{1,1}v_{1,0} + v_{1,1} + c_{1,2}v_{1,2} \quad (7b)$$

$$I_0 = c_{1,1}I_{0,0} + I_{0,1} \quad (7c)$$

For Mode 2, a similar approach is taken with the measurements corresponding to currents $I_0$, $I_1$, $I_2$, and $I_3$ being extracted (label 1004 in FIG. 8C), e.g., by identifying those components of the monitor electrode voltage signals having the corresponding frequency components. The difference between the measurements for the desired truncated current flow pattern 1008 and the extracted measurements 1004 is that set of voltage measurements that would be obtained in response to the current flow pattern 1006, which can be readily derived from the measurements corresponding to current $I_3$. For convenience, the following equations presume that this extraction has already been done and we henceforth drop the prime from the monitor electrode voltages ($v'_{i,j}$).

Figure 8C:
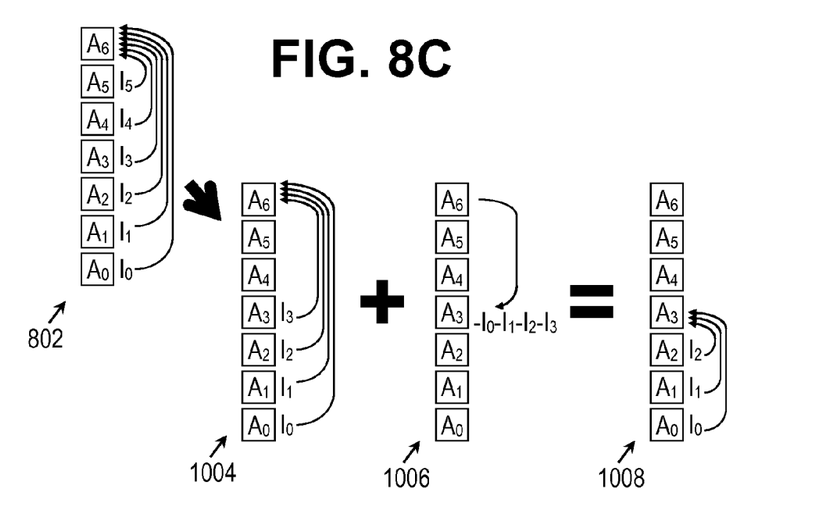

The focusing of Mode 2 is provided by setting the potentials of monitor electrodes M1, M2, and M3 equal. The corresponding software focusing equation of Mode 2 is:

$$\begin{bmatrix} v_{1,0}-v_{2,0} & v_{1,2}-v_{2,2} & v_{1,3}-v_{2,3} \\ v_{2,0}-v_{3,0} & v_{2,2}-v_{3,2} & v_{2,3}-v_{3,3} \\ I_{1,1} & I_{2,2} & I_{3,3} \end{bmatrix} \begin{bmatrix} c_{2,1} \\ c_{2,2} \\ c_{2,3} \end{bmatrix} = \begin{bmatrix} v_{2,1}-v_{1,1} \\ v_{3,1}-v_{2,1} \\ -(I_{0,1}+I_{1,1}) \end{bmatrix} \quad (8a)$$

with the survey voltage and current given by $$V_{M1}=c_{2,1}v_{1,0}+v_{1,1}+c_{2,2}c_{1,2}+c_{2,3}v_{1,3}, \quad (8b)$$

$$I_0=c_{2,1}I_{0,0}+I_{0,1} \quad (8c)$$

yielding an apparent Mode 2 resistivity:

$$R_2 = k_2 \frac{V_{M1}(f0, f1, f2, f3)}{I_{A0}(f0, f1)}. \quad (8d)$$

For Mode 3, the focusing conditions (equal potential on monitor electrodes M1-M4) can be expressed as:

$$\begin{bmatrix} v_{1,0}-v_{2,0} & v_{1,2}-v_{2,2} & v_{1,3}-v_{2,3} & v_{1,4}-v_{2,4} \\ v_{2,0}-v_{3,0} & v_{2,2}-v_{3,2} & v_{2,3}-v_{3,3} & v_{2,4}-v_{3,4} \\ v_{3,0}-v_{4,0} & v_{3,2}-v_{4,2} & v_{3,3}-v_{4,3} & v_{3,4}-v_{4,4} \\ I_{0,0} & I_{2,2} & I_{3,3} & I_{4,4} \end{bmatrix} \begin{bmatrix} c_{3,1} \\ c_{3,2} \\ c_{3,3} \\ c_{3,4} \end{bmatrix} = \quad (9a)$$

$$\begin{bmatrix} v_{2,1}-v_{1,1} \\ v_{3,1}-v_{2,1} \\ v_{4,1}-v_{3,1} \\ -(I_{0,1}+I_{1,1}) \end{bmatrix}$$

with the survey voltage and current given by $$V_{M1}=c_{3,1}v_{1,0}+v_{1,1}+c_{3,2}v_{1,2}+c_{3,3}v_{1,3}+c_{3,4}v_{1,4}, \quad (9b)$$

$$I_0=c_{3,1}I_{0,0}+I_{0,1} \quad (9c)$$

yielding a Mode 3 apparent resistivity of $$R_3 = k_3 \frac{V_{M1}(f0, f1, f2, f3, f4)}{I_{A0}(f0, f1)}. \quad (9d)$$

For Mode 4, the equations become:

$$\begin{bmatrix} v_{1,0}-v_{2,0} & v_{1,2}-v_{2,2} & v_{1,3}-v_{2,3} & v_{1,4}-v_{2,4} & v_{1,5}-v_{2,5} \\ v_{2,0}-v_{3,0} & v_{2,2}-v_{3,2} & v_{2,3}-v_{3,3} & v_{2,4}-v_{3,4} & v_{2,5}-v_{3,5} \\ v_{3,0}-v_{4,0} & v_{3,2}-v_{4,2} & v_{3,3}-v_{4,3} & v_{3,4}-v_{4,4} & v_{3,5}-v_{4,5} \\ v_{4,0}-v_{5,0} & v_{4,2}-v_{5,2} & v_{4,3}-v_{5,3} & v_{4,4}-v_{5,4} & v_{4,5}-v_{5,5} \\ I_{0,0} & I_{2,2} & I_{3,3} & I_{4,4} & I_{5,5} \end{bmatrix} \begin{bmatrix} c_{4,1} \\ c_{4,2} \\ c_{4,3} \\ c_{4,4} \\ c_{4,5} \end{bmatrix} = \quad (10a)$$

$$\begin{bmatrix} v_{2,1}-v_{1,1} \\ v_{3,1}-v_{2,1} \\ v_{4,1}-v_{3,1} \\ v_{5,1}-v_{4,1} \\ -(I_{0,1}+I_{1,1}) \end{bmatrix}$$

$$V_{M1} = c_{4,1}v_{1,0} + v_{1,1} + c_{4,2}v_{1,2} + c_{4,3}v_{1,3} + c_{4,4}v_{1,4} + c_{4,5}v_{1,5}, \quad (10b)$$

$$I_0 = c_{4,1}I_{0,0} + I_{0,1} \quad (10c)$$

$$R_4 = k_4 \frac{V_{M1}(f0, f1, f2, f3, f4, f5)}{I_{A0}(f0, f1)}. \quad (10d)$$

For Mode 5, the equations are:

$$\begin{bmatrix} v_{1,0}-v_{2,0} & v_{1,2}-v_{2,2} & v_{1,3}-v_{2,3} & v_{1,4}-v_{2,4} & v_{1,5}-v_{2,5} \\ v_{2,0}-v_{3,0} & v_{2,2}-v_{3,2} & v_{2,3}-v_{3,3} & v_{2,4}-v_{3,4} & v_{2,5}-v_{3,5} \\ v_{3,0}-v_{4,0} & v_{3,2}-v_{4,2} & v_{3,3}-v_{4,3} & v_{3,4}-v_{4,4} & v_{3,5}-v_{4,5} \\ v_{4,0}-v_{5,0} & v_{4,2}-v_{5,2} & v_{4,3}-v_{5,3} & v_{4,4}-v_{5,4} & v_{4,5}-v_{5,5} \\ v_{5,0}-v_{6,0} & v_{5,2}-v_{6,2} & v_{5,3}-v_{6,3} & v_{5,4}-v_{6,4} & v_{5,5}-v_{6,5} \end{bmatrix} \begin{bmatrix} c_{5,1} \\ c_{5,2} \\ c_{5,3} \\ c_{5,4} \\ c_{5,5} \end{bmatrix} = \quad (11a)$$

$$\begin{bmatrix} v_{2,1}-v_{1,1} \\ v_{3,1}-v_{2,1} \\ v_{4,1}-v_{3,1} \\ v_{5,1}-v_{4,1} \\ v_{6,1}-v_{5,1} \end{bmatrix}$$

$$V_{M1} = c_{5,1}v_{1,0} + v_{1,1} + c_{5,2}v_{1,2} + c_{5,3}v_{1,3} + c_{5,4}v_{1,4} + c_{5,5}v_{1,5} \quad (11b)$$

$$I_0 = c_{5,1}I_{0,0} + I_{0,1} \quad (11c)$$

$$R_5 = k_5 \frac{V_{M1}(f0, f1, f2, f3, f4, f5)}{I_{A0}(f0, f1)} \quad (11d)$$

A comparison of equations (10) and (11) show that the software focusing equation of Mode 5 does not include the current continuity condition but instead has one more voltage balance condition over the monitor electrode pair of M5 and M6. So the number of unknowns is fixed at 5 for this Mode.

The range of laterolog array sizes provides a tool with an extremely high resolution and a range of investigation depths. Moreover, these benefits are achievable with a reduced number of measurement signals due to the use of the split monitor electrodes, which also serve to provide improved signal strengths.

Figure 9:
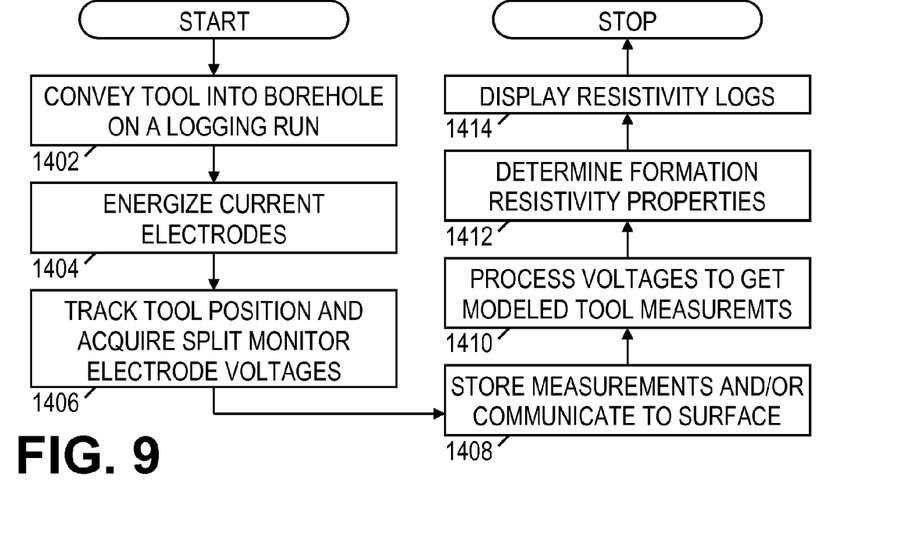
FIG. 9 is a flow diagram of a multi-array laterolog logging method.

FIG. 9 provides an overview of a multi-array laterolog resistivity logging method. Beginning in block 1402, the tool is conveyed through a borehole containing a conductive fluid. The tool can be drawn through the borehole by a wireline cable, or conveyed on a tubing string, or incorporated into the bottom hole assembly of a drill string. In block 1404 the tool electronics energize the current electrodes to generate currents in the manner outlined previously. In block 1406, the tool or some other component of the system tracks the motion and/or position of the tool as the tool electronics sample the voltage signals from the split monitor electrodes. In block 1408, the tool electronics record the voltage signals into an information storage medium and/or communicate the voltage signal data to a processing facility on the surface. In block 1410, the voltage signals are processed (downhole or at the surface) in accordance with one of the methods discussed above to determine the monitor electrode measurements and/or the generated currents (e.g., $V_{M1}$ and/or $I_0$) expected for each of the tool modes 1-5 (see FIGS. 7A-7F). In block 1412, the voltage and current values for the various modes are used to determine formation resistivity measurements at different depths of investigation (i.e., different effective radial measurement depths), enabling the logging system to determine a formation resistivity log that depends both on position along the borehole axis and on radial distance from the borehole axis. Some or all of the formation resistivity log data is displayed to a user in block 1414.

Numerous variations and modifications will become apparent to those skilled in the art once the above disclosure is fully appreciated. Although not necessarily classified as such, the pair of M1 and M1' monitor electrodes can also be treated as a split monitor electrode. It is intended that the claims be interpreted to embrace all such variations and modifications.

What is claimed is:

1. A resistivity logging system that comprises:
a tool body having:
a center electrode positioned between multiple pairs of guard electrodes, wherein said multiple pairs of guard electrodes are positioned between a pair of return electrodes on said tool body; and
multiple pairs of split monitor electrodes, each of said split monitor electrodes having two electrically-coupled component electrodes with an associated guard electrode therebetween; and
electronics that provide a primary current from the center electrode to the pair of return electrodes and provide a respective guard current from each pair in said multiple pairs of guard electrodes to the pair of return electrodes, the electronics further operating to acquire a voltage measurement from each of said pairs of split monitor electrodes.

2. The system of claim 1, wherein said multiple pairs of split monitor electrodes include at least three pairs.

3. The system of claim 2, wherein the split monitor electrodes in each pair of split monitor electrodes are electrically coupled together.

4. The system of claim 1, wherein the electronics drive all of said primary and guard currents concurrently.

5. The system of claim 4, wherein the primary current and each of the respective guard currents has a spectral signature that distinguishes it from other currents.

6. The system of claim 4, wherein each of the guard currents has a unique signal frequency.

7. The system of claim 6, wherein the primary current has at least one signal frequency different than each of the guard current signal frequencies.

8. The system of claim 7, wherein the primary current further includes a signal frequency that matches a signal frequency of an innermost pair of guard electrodes.

9. The system of claim 1, wherein the guard electrodes in each pair are shorted together, and the monitor electrodes in each pair are shorted together.

10. The system of claim 1, further comprising:
a processor that receives that receives measurements indicative of electrical resistances associated with the primary current and the guard currents, wherein the processor processes the measurements to determine measurements corresponding to a tool having a reduced number of guard electrodes.

11. The system of claim 1, wherein the tool body is a drilling collar.

12. The system of claim 1, wherein the tool body is a wireline sonde.

13. A resistivity logging method that comprises:
receiving from a logging tool measurements indicative of a voltage for each of multiple split monitor electrodes, each split monitor electrode having two electrically-coupled component electrodes with an associated guard electrode therebetween, the logging tool having multiple pairs of said guard electrodes positioned around a center electrode and between a pair of return electrodes;
processing said measurements to determine a localized formation resistivity at a position associated with a location of the center electrode during collection of said measurements; and
displaying said localized formation resistivity as a function of position.

14. The method of claim 13, wherein said processing comprises:
deriving measurements indicative of electrical resistances between the center electrode and each pair of guard electrodes; and
combining said derived measurements in a manner that enforces an assumption of commensurate voltages on the center electrode and at least one pair of guard electrodes.

15. The method of claim 13, further comprising driving said guard electrode pairs and center electrode with respective current sources.

16. The method of claim 15, wherein the respective current sources provide currents with different signal frequencies.

17. A resistivity logging tool that comprises:
a tool body having a center electrode positioned between symmetrically-spaced pairs of guard electrodes with at least some of the guard electrodes positioned between electrically-coupled component electrodes of associated split monitor electrodes;
respective current sources that drive the center electrode and each pair of guard electrodes relative to the pair of return electrodes;
one or more analog to digital converters that digitize representations of split monitor electrode voltages; and
at least one processor that processes said digitized representations to determine a resistivity measurement associated with a tool having a reduced number of guard electrodes.

18. The tool of claim 17, comprising at least five symmetrically-spaced pairs of guard electrodes.

19. The tool of claim 17, wherein the current sources drive all of said primary and guard currents concurrently.

20. The tool of claim 19, wherein each current source provides a current with a spectral signature that distinguishes it from the currents from the other current sources.

* * * * *